J. W. DUNHAM.
GROUND SLUICING APPARATUS.
APPLICATION FILED MAR. 4, 1920.
1,380,642.
Patented June 7, 1921.
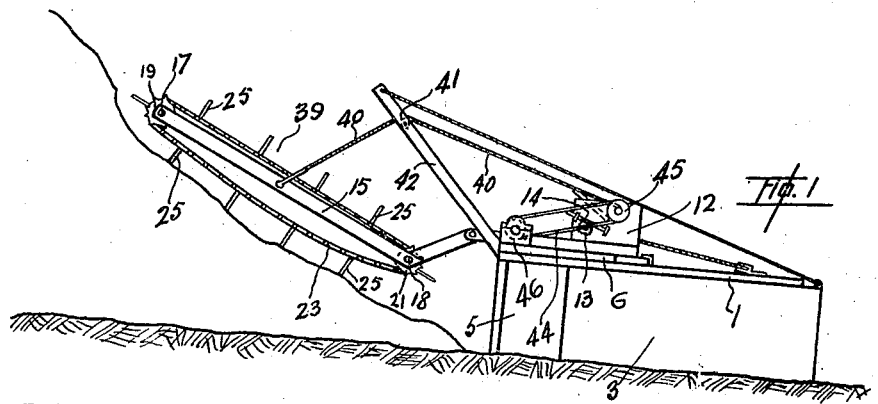
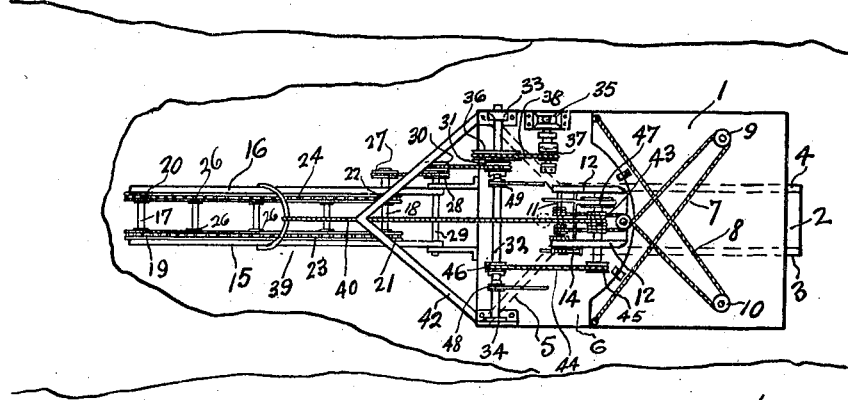
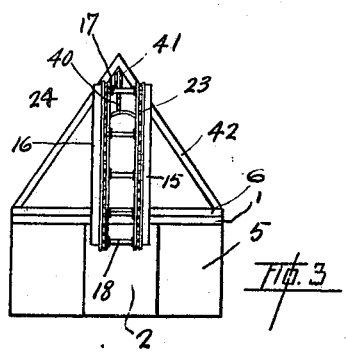
INVENTOR.
James Wesley Dunham
BY
ATTYS

UNITED STATES PATENT OFFICE.

JAMES WESLEY DUNHAM, OF BURNABY, BRITISH COLUMBIA, CANADA.

GROUND-SLUICING APPARATUS.

1,380,642.  Specification of Letters Patent.  Patented June 7, 1921.

Application filed March 4, 1920. Serial No. 363,299.

*To all whom it may concern:*

Be it known that I, JAMES WESLEY DUNHAM, a subject of the King of Great Britain, and a resident of Burnaby, in the Province of British Columbia, Canada, have invented certain new and useful Improvements in Ground-Sluicing Apparatus, of which the following is a specification.

My invention relates to improvements in apparatus for sluicing placer ground, and the object of my invention is to provide an apparatus the use of which will increase the efficiency of the water used in hydraulicking such ground and reduce the number of men required to work it, thus rendering it possible to develop properties of this nature at a profit where at the present time it would not pay to install a hydraulic plant.

I attain this object by the construction illustrated in the accompanying drawings in which—

Figure 1 is a side elevation of the apparatus.

Fig. 2 is a plan view.

Fig. 3 is a front end view.

Similar figures of reference indicate similar parts throughout the several views.

1 indicates a platform covering a channel or sluice-way 2 formed by the walls 3 and 4 the forward end of which channel is flared, as at 5, while its rear end is adapted to fit the end of a sluice box, not shown, but which is of the well-known construction. On the forward end of the platform 1 is mounted a secondary platform 6 pivotally mounted so that it may be swung in either direction, the operation of this platform being controlled by cables 7 and 8 reeved through suitable blocks or sheaves 9 and 10, these cables being connected at one end to the opposite rear corners of the platform 6 while their other ends are led to a barrel 11 rotatably mounted on a frame 12, which barrel is rotated by means of a worm 13 secured to it and a worm shaft 14 also mounted on the frame and meshing with the worm.

Hingedly connected to the front end of the platform 6 is a forwardly extending framework, indicated generally by the numeral 39, consisting of two side stringers 15 and 16 suitably stiffened and braced together, at the outer and inner ends of which are rotatably mounted shafts 17 and 18 provided with chain sprockets 19—20 and 21—22 respectively around which are passed chains 23 and 24 to which are secured at spaced intervals fingers 25, these chains being preferably supported on idler sprockets 26, as shown in Fig. 2. The lower shaft 18 is extended and provided with a sheave 27 by which it is belt or rope-connected to a sheave 28 mounted on a transverse shaft 29, the latter shaft being provided with another sheave 30 belt or rope-connected to a sheave 31 secured to the main shaft 32, which main shaft is mounted on the platform 6 in suitable bearings 33 and 34 and is driven by means of a gasolene engine 35, or any other prime mover, through sheaves 36 and 37 on the main and engine shafts respectively, these sprockets being belt or rope-connected, as at 38 in Fig. 2. The frame-work 39 is supported by means of a cable 40 one end of which is connected to it while its other end is passed over a sheave 41 suitably mounted adjacent the upper end of a derrick 42, the cable end then passing to a drum 43 rotatably mounted on the frame 12 and rotated to wind the cable to raise the framework by means of a belt or rope 44 passed around sheaves 45 and 46 secured to the drum and main shafts respectively, the lowering of the framework being effected by the releasing of a brake 47 with which the drum is provided so that the weight of the framework will rotate the drum in the unwinding direction.

48 and 49 indicate suitable clutches, which may be of any well-known type, for controlling the operation of sheaves 46 and 31 respectively.

The manner in which the apparatus operates may be briefly described as follows:—The ground having been sloped to the proper rake the apparatus is moved into position with the rear end of the channel 2 abutting the forward end of the first sluice box. The framework 39 is then lowered until the fingers 25 are in position to scrape the surface of the ground to be operated on, after which the chains are set in motion, whereupon the fingers will loosen up both the ground and any boulders therein, so that the water directed thereon at the same time will readily wash the loosened ground into the sluice way 2 and carry it along into the sluice boxes, the entire operation being effected mechanically and without the use of manual labor for loosening the ground, thus enabling a greater area to be washed in less time and with less expense than at the present time.

What I claim as my invention is:

1. An apparatus of the class described comprising, a platform, mechanical means mounted thereon for loosening placer ground whereby the working of the same during hydraulicking is facilitated, and a sluice-way under the platform adapted to direct the loosened ground to a sluice box at its rear end.

2. An apparatus of the class described comprising, a stationary platform, a second platform pivotally mounted thereon, a jib framework extending forwardly from the pivotally mounted one capable of being raised or lowered, longitudinally traveling chains mounted on said jib provided with spaced fingers, means for raising or lowering said jib, means for operating said chains, means for swinging the second platform about its pivot, and a longitudinal sluice-way on the walls of which the said platforms are mounted.

3. An apparatus of the class described comprising a sluiceway having a top wall forming a platform, digging means for loosening the ground at one end of the sluiceway to facilitate working of the ground during hydraulicking, and means carried by said platform for supporting and operating said digging means.

4. An apparatus of the class described comprising a sluiceway having a top wall forming a platform, a digger element for loosening the ground at one end of the sluiceway to facilitate working of the ground during hydraulicking, a second platform pivotally mounted on said first platform, means comprising a drum and cables for rotating said second platform relative to the first platform, and means carried by the rotatable platform for operating and adjustably supporting said digging means.

Signed at Vancouver, B. C. Canada, this 16th day of February, 1920.

JAMES WESLEY DUNHAM.